April 5, 1960        A. DUNLOP        2,931,081

MOULD STRUCTURE AND ITS PRODUCTION

Filed March 9, 1956

*INVENTOR.*
ADAM DUNLOP

BY

ATTORNEY

United States Patent Office 2,931,081
Patented Apr. 5, 1960

2,931,081

MOULD STRUCTURE AND ITS PRODUCTION

Adam Dunlop, Newcastle-upon-Tyne, England, assignor to Shaw Process Development Corp., Port Washington, N.Y., a corporation of New York Application March 9, 1956, Serial No. 570,508

7 Claims. (Cl. 22—193)

This invention relates to moulds for metal casting and particularly concerns moulds for producing high precision castings, as exemplified by patent application Serial No. 347,829, filed April 9, 1953, by Noel Shaw, for "Metal Casting, Moulds Therefor and Their Production," now U.S. Patent No. 2,795,022, issued June 11, 1957, and by application Serial No. 414,884, filed March 8, 1954, by Clifford Shaw entitled "Method for the Production of Casting Moulds," now U.S. Patent No. 2,811,760, issued November 5, 1957, applicant being a director of Shaw Processes Limited, to which the aforesaid applications were assigned, and which Shaw Processes Limited assigned these applications to Shaw Process Development Corp., and which Shaw Processes Limited filed an application in Great Britain on March 9, 1955, for the subject matter covered by the present invention, and which application was assigned to Shaw Processes Limited. The present application is a corresponding application to the British application and being assigned by applicant to Shaw Process Development Corp.

The aforesaid application Serial No. 347,829 covers the method of producing refractory moulds for metal casting from comminuted highly refractory material and a binder produced in situ by mixing said refractory material with a mixture of lower alkyl silicate, alcohol, distilled water and an aqueous acid gelling agent, and which method includes the step of "firing" the mould by igniting the alcohol formed by hydrolysis of the binder and escaping from the surfaces of the formed mould as soon as the latter has set by gelling.

A mould formed by the use of the aforestated ingredients, especially when moulds of large dimensions are concerned, becomes rather expensive. According to the present invention a relatively inexpensive and very serviceable mould can be produced which will have all the requirements for casting metal or other matter of high melting temperatures.

Briefly, the manner in which such mould can be formed is to provide a sturdy, rather voluminous backing body from inexpensive refractory material, to which is applied a relatively thin layer or lining made from highly refractory material and into which lining the shape of the pattern to be used is impressed.

More specifically, the method of producing such mould comprises providing a backing mixture consisting of moistened ordinary foundry-type core sand and a suitable binder, such as a solution of sodium silicate. Such mixture is relatively porous and into the porous mixture there is introduced carbon dioxide gas until the sand and sodium silicate mixture sets to a hard mass. The highly refractory layer applied to the backing is produced as follows: A slurry is formed by mixing comminuted highly refractory aggregate, such as sillimanite, with a binder consisting of lower alkyl silicate, commercial denatured ethyl alcohol and distilled water, to which is added an aqueous alkaline gelling agent. The resulting slurry is then applied, in a relatively thin layer, over the pattern and to the body of the backing, and at the moment the layer sets by gelling its pattern-impressed surfaces are "fired," whereby the alcohol released by hydrolysis of the binder is rapidly and uniformly burned off.

That "firing" of the layer fixates the outer pattern-impressed faces thereof, while the interior body structure of the layer can expand or contract within the confines of the outer fixated faces of the layer due to changes in temperature to which the layer may be subjected. To explain, the interior body structure of the layer constitutes interlocking refractory particles which are spaced from one another by minute crazes or microcracks so that these particles can readily move relative to one another without in any way affecting by their relative movement, the outer contours of the fixated pattern-impressed surfaces.

It is the prime object of this invention therefore to produce a relatively inexpensive, but effective, sturdy mould structure for producing high precision castings from materials having high melting temperatures.

That and numerous other objects and important advantages of the present disclosure will become more fully apparent from the ensuing description, in conjunction with the accompanying drawings, wherein.

The method of producing the mould according to the present invention will be now described in detail. There are several ways of producing the mould.

Figure 1:
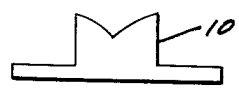
Fig. 1 is an end view of a pattern.
Figure 2:
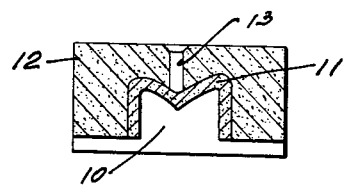
Fig. 2 illustrates the pattern shown in Fig. 1 to which is applied a temporary spacer, over which sits the body of a backing structure.

In Fig. 1 a pattern 10 is shown corresponding to the casting to be made therefrom. To this pattern 10 is applied, as shown in Fig. 2, a shroud 11 formed from either clay or plaster of Paris, and which clay is intended to rapidly harden. When that shroud is hard there is applied over it and over the pattern a backing 12 in the form of a sand-sodium silicate mixture which is rammed about the shrouded pattern. That mixture is porous, and in that mixture there is introduced carbon dioxide gas until the mixture fully hardens. When hard, the backing is removed and the plaster or clay shroud is stripped from the pattern.

Figure 3:
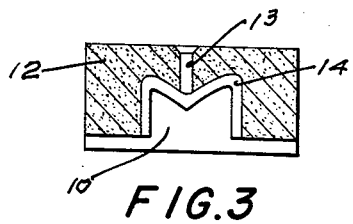
Fig. 3 is similar to that of Fig. 2 with the spacer removed.
Figure 5:
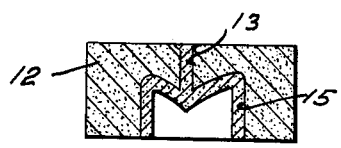
Fig. 5 illustrates the mould in its finished form ready for casting.
Figure 4:
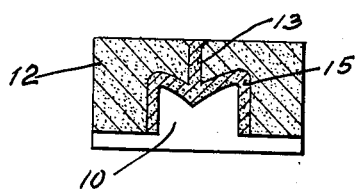
Fig. 4 shows a highly refractory layer filling the space between the pattern and the backing.

As will be seen in Fig. 2, there is provided through the backing a passage or gate 13. After the removal of shroud 11, backing 12 is again placed over the pattern, as shown in Fig. 3. Due to the removal of the shroud there will be formed a space 14 between the pattern and the backing. Now space 14 is filled through gate 13 with a highly refractory slurry mix 15, as seen in Fig. 4. That refractory slurry mix 15 is permitted to set by gelling, and the moment it is thus set, the pattern is removed and the exterior surfaces of the thus produced, relatively thin layer or lining is now "fired," that is, subjected to intense uniform heat, whereby the outer pattern-impressed surfaces are fixated, while at the same time the interior structure of the layer becomes microcracked.

Figure 6:
Fig. 6 is an end view of an oversize pattern.
Figure 7:
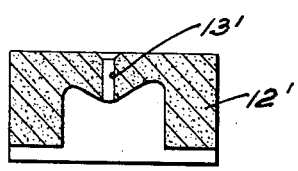
Fig. 7 is a mould backing into which the contour of the oversize pattern is impressed.

A modified form of the method can be explained in connection with Figs. 6 and 7. In this modified form an oversize pattern 10' is employed, as shown in Fig. 6. That pattern is then invested with backing material 12', described above, which is rammed and again treated with carbon dioxide gas. It will be noted that the backing 12' is also provided with a gate or passage 13'. When backing 12' sets, the oversize pattern 10' is removed and replaced by pattern 10, shown in Fig. 1. Due to the oversize contour of pattern 10' there is again provided a space between pattern 10 and the backing, such as shown in Fig. 3. Now again the space is filled with a highly refractory mixture 15, and when that mixture is set by gelling, the surfaces of the thus formed thin layer are "fired."

The highly refractory facing joined with the backing is composed of highly refractory comminuted sillimanite graded as follows:

| Sieve size: | Percentage |
| --- | --- |
| —10+16 | 40.3 |
| —16+22 | 7.6 |
| —22+30 | 5.8 |
| —30+44 | .7 |
| —44+60 | .7 |
| —60+100 | 4.7 |
| —100+150 | 6.4 |
| —150+200 | 5.4 |
| —200 | 28.4 |

The binder mixed with the refractory is composed of the following ingredients:

3437 ccs. of ethyl silicate of a silica content of 40 to 45%,
800 ccs. of industrial denatured ethyl alcohol, and
304 ccs. of distilled water, which above ingredients form approximately a gallon of colloidal silica solution in alcohol.

To 132 grams of the above refractory there is added 100 ccs. of the binder, to which is mixed 5 ccs. of a 10% by weight aqueous solution of ammonium carbonate.

The ingredients are now mixed to a slurry which remains freely mobile for approximately 1½ minutes, during which stage it is poured around the pattern through the duct or gate 13. After approximately 1½ minutes the slurry gels suddenly, whereupon it is stripped from the pattern and its exposed surfaces are immediately "fired." These surfaces, after "firing," will retain the exact mirror replica of the pattern used.

In "firing" the surfaces of the highly refractory layer or lining in free air, all alcohol formed by hydrolysis is burned off. The mould is now ready for casting.

Having thus described the present invention, what is claimed as new is:

1. The method of producing an inexpensive, sturdy, highly refractory mold for metal casting consisting of a backing body and a facing which comprises manufacturing the backing body from a mixture of inexpensive refractory material and a binder, said backing body having formed therein a pouring spout, placing said backing body above and spaced apart from a pattern, thereby defining a space to be filled with the facing material, pouring through the aforesaid spout into the said space between the backing body and the pattern a slurry comprising a high refractory material and a binder of a lower alkyl silicate, water and a gelling accelerator, thereby filling the said space, permitting the slurry to set by gelling, separating the pattern from the set slurry, and igniting the surface of the gelled mass and allowing the intense flames resulting from said ignition to burn until the flammables are consumed.

2. The method according to claim 1, and wherein the backing mixture consists of moistened ordinary foundry-type core sand and a binder, such as a solution of sodium silicate, and into which mixture, which is porous, there is introduced carbon dioxide gas until the mixture sets to a hard mass.

3. The method according to claim 1, and wherein said slurry is composed of highly refractory aggregate, ethyl silicate, alcohol, water and an aqueous alkaline solution as gelling accelerator.

4. The method according to claim 2, and wherein said binder is a solution of sodium silicate and wherein the proportion of that binder to the core sand is 3% to 10% by weight of the sand.

5. The method according to claim 3, and wherein the refractory aggregate is comminuted sillimanite, said ethyl silicate having a 40 to 45% silica content, said alcohol comprising industrial denatured ethyl alcohol, the water being distilled water, said gelling accelerator being an aqueous solution of ammonium carbonate.

6. The method of producing an inexpensive, sturdy, highly refractory mold for metal casting consisting of a backing body and a facing which comprises manufacturing the backing body from a mixture of inexpensive refractory material and a binder, said backing body having formed therein a pouring spout, said manufacturing comprising, placing a plastic hardenable layer of clay or gypsum over a pattern, allowing the layer of plastic to harden, and superposing thereon a mixture of inexpensive refractory material and a binder, allowing said mixture to set, thereby forming the backing body, and removing the same; removing the hardened plastic layer from the pattern; then placing said backing body above and spaced apart from the pattern, thereby defining a space to be filled with the facing material, pouring through the aforesaid spout into the said space between the backing body and the pattern a slurry comprising a high refractory material and a binder of a lower alkyl silicate, water and a gelling accelerator, thereby filling the said space, permitting the slurry to set by gelling, separating the pattern from the set slurry, and igniting the surface of the gelled mass and allowing the intense flames resulting from said ignition to burn until the flammables are consumed.

7. The method of producing an inexpensive, sturdy, highly refractory mold for metal casting consisting of a backing body and a facing which comprises manufacturing the backing body from inexpensive refractory material, said backing body having formed therein a pouring spout, said manufacturing comprising superposing a mixture of inexpensive refractory material and a binder over an oversize pattern, allowing said mixture to set, thereby forming the backing body; removing the thus-formed backing body, and placing said backing body above and spaced apart from the final pattern, thereby defining a space to be filled with the facing material, pouring through the aforesaid spout into the said space between the backing body and the pattern a slurry comprising a high refractory material and a binder of a lower alkyl silicate, water and a gelling accelerator, thereby filling the said space, permitting the slurry to set by gelling, separating the pattern from the set slurry, and igniting the surface of the gelled mass and allowing the intense flames resulting from said ignition to burn until the flammables are consumed.

References Cited in the file of this patent

UNITED STATES PATENTS

| 1,634,106 | Hopkinson | June 28, 1927 |
| 2,380,945 | Collins | Aug. 7, 1945 |
| 2,496,170 | Mann | Jan. 31, 1950 |
| 2,748,435 | Hackett | June 5, 1956 |
| 2,846,742 | Wagner | Aug. 12, 1958 |

OTHER REFERENCES

Foundry, Mar. 1956, pages 128–135 and 104–109.
Foundry Trade Journal, Feb. 2, 1956, pages 99–105.